March 11, 1941.　　　　P. A. NEWMAN　　　　2,234,382
MACHINE FOR CUTTING OR GRINDING SPIRALLY GROOVED CAMS
Filed July 19, 1939　　　　5 Sheets-Sheet 1

Patented Mar. 11, 1941

2,234,382

UNITED STATES PATENT OFFICE 2,234,382

MACHINE FOR CUTTING OR GRINDING SPIRALLY GROOVED CAMS

Percy A. Newman, La Fayette, Ind., assignor to Ross Gear & Tool Company, La Fayette, Ind., a corporation of Indiana Application July 19, 1939, Serial No. 285,400

25 Claims. (Cl. 51—33)

The object of this invention is to provide a novel machine for cutting or grinding spirally grooved blanks or cam actuating members such, for example, as are employed in the so-called Ross cam and lever steering gears disclosed in the U. S. Letters Patent of David E. Ross, #1,-567,997 dated December 29, 1925, and #2,071,235 dated February 16, 1937.

The present invention provides a machine in which the blanks to be cut, or the cams to be ground, are positioned and rotated on a horizontally disposed work table adjacent to a horizontally disposed rotatable cutter or grinding wheel which operates upon the blank or cam to cut or grind the groove therein; means being provided whereby during the cutting or grinding operation the rotatable cutter or grinding wheel is given an arcuate movement controlled by a reciprocable master cam so shaped that the said cutter or grinding wheel is caused to move on its arcuate path at any desired rate of speed, either constant or intermittently variable, relative to the constant rotation of the blank or cam on the work table so as to produce in the said blank or cam a groove which may be of constant or varied pitch, as desired.

In brief, the machine forming the subject-matter of the present invention comprises—

(1) A work table upon which is rotated a blank or steering gear cam mounted between axially aligned head and tail-stocks, said table being longitudinally and transversely immovable with respect to the constant or intermittently variable arcuate movement of the rotating cutter or grinding wheel;

(2) A carriage mounted on the work table and disposed with its axis at 90° to the axis of the said head and tail-stocks, and arranged to be moved along said axis to and from the blank or cam, said carriage having journaled therein a head spindle carrying a head which houses a self-contained rotatable grinder or cutter whose axis, while parallel to, is spaced from the axis of the said head spindle an amount equal to the radius of the desired arc.

(3) A drive mechansim common to the aforementioned units (exclusive of the self-contained grinder or cutter proper) by which rotation is imparted to the work blank or cam, and simultaneous arcuate travel is imparted to the self-contained rotatable grinder or cutter, said arcuate travel with respect to the rotation of the blank or cam having a constant or a variable ratio, as required, dependent upon the necessary gearing and master cam in the aforesaid drive mechanism.

The three above units are mounted upon a common bed or base and, exclusive of the grinder or cutter proper, are driven by a single prime mover which may have a variable speed, or have a constant speed with provisions for accelerating or decelerating the speed by pulley changes effected at the power source.

I will explain the invention with reference to the accompanying drawings which illustrate one practical embodiment thereof to enable others familiar with the art to adopt and use the same; and will summarize in the claims the novel features of construction and novel combinations of parts for which protection is desired.

In said drawings—

The machine shown comprises a base upon which at its front end or operating position is mounted a work table 2 carrying the mechanism for supporting and rotating the blank or cam C to be cut or ground.

Upon base 1 is slidably mounted a carriage 3 having its axis of movement disposed 90° with respect to the axis of the aforesaid blank or cam supporting and rotating mechanism; and in said carriage is journaled a head spindle 4 (Fig. 2) having at its end adjacent to the aforesaid table 2 a head 5 in which is journaled the self-contained cutter or grinder G (hereinafter referred to) including means for applying rotation to the same independent of the main drive of the machine, an arcuate swinging movement being imparted to said spindle 4 (and head 5 carried thereby) through pinion 6 secured preferably at the end of spindle 4 opposite from the head 5.

Upon the base and preferably at the rear end, i. e., that opposed to the work table 2, is mounted a standard 7 which straddles the rear portion of the carriage 3, said standard being so proportioned as to provide ample support for the feed drive casting 26 (hereinafter referred to) containing the main drive shaft and gearing by which motion is transmitted both to the mechanism for rotating the blank or cam C to be cut or ground, and to the mechanism by which oscillation is applied to pinion 6 which controls the arcuate travel of the rotating cutter or grinder, (hereinafter referred to), said arcuate travel bearing a predetermined relation to the rotation of the aforesaid blank or steering gear cam C.

Rotatably mounted in bearings in work table 2 is headstock spindle 8 which supports one end of the blank or cam C, preferably utilizing a ball bearing 8a (Fig. 4) to position said end of the cam therein, and said spindle 8 carrying a key 8b engaging a previously machined slot C' in the cam C whereby a positive drive is applied from said spindle 8 to the said blank or cam C upon which the helical groove is to be cut or ground. The opposite end of blank or cam C is supported by tailstock 9 preferably through a ball bearing 9a (Fig. 4) held in said tailstock; and said tailstock 9 is housed in the work table 2 and actuated by hand lever 10 on the shaft of a pinion 10a meshing with a rack 9b on the tailstock; and when the tailstock is adjusted into proper position same is held fixedly in work table 2 by means of clamps 11a and 11b (Fig. 8) one of which is engaged by a screw 11c operated by hand lever 11.

Figure 5:
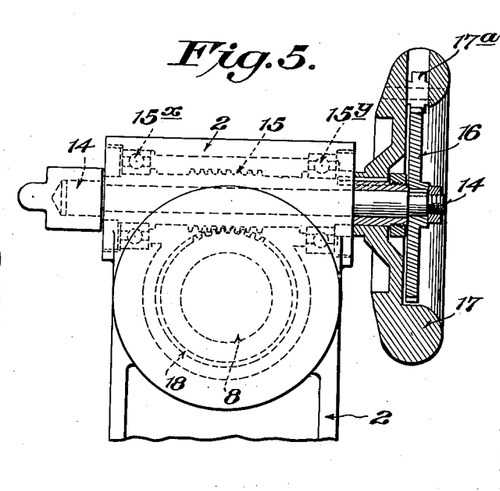
Fig. 5 is a side elevation partly in section of the headstock looking from the left in Fig. 4.
Figure 6:
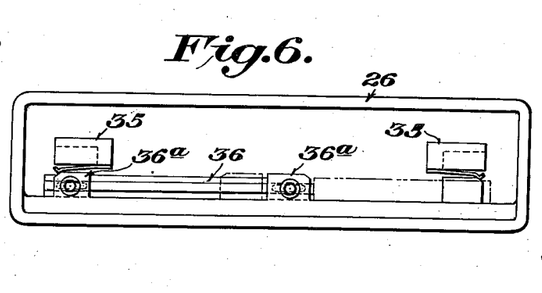
Fig. 6 is a top plan view showing the stops and switches for controlling the travel of the master cam, and consequently the machine style.

Rotation is applied to the blank or steering gear cam C at a constant speed from a main drive shaft 12 (Fig. 2) journaled in bearings in feed drive casting 26, and through a universal joint shaft 13 to a shaft 14 (Figs. 5-6) sleeved in hollow worm 15 journaled in ball bearings 15x, 15y mounted in the work table 2, and to clutch plate 16 secured on the aforesaid shaft 14 through its engagement with spring pressed pawl 17a on hand wheel 17 secured to worm 15 and consequently through the meshing of said worm 15 with worm wheel 18 mounted on headstock spindle 8, the latter being mounted in ball or roller bearings 8x, 8y in the work table 2.

Manual rotation may be applied to the headstock spindle 8 independently of the main drive shafting 12—13—14 by disengagement of spring pressed pawl 17a from toothed clutch plate 16. As will be hereinafter disclosed this will permit close alignment between the master cam contour and a previously cut steering gear cam groove.

Rotation is applied to main drive shaft 12 (Fig. 2) through pulley 12a secured to the same and driven by belts 19 running over a pulley 20 on the shaft of a two-speed reversing motor 21 (Fig. 3) which is mounted in the base 1 of the machine, and controlled for rotation in either direction by hand switch 22 (Fig. 1) mounted on work table 2 at the front or operating position of the machine.

Main drive shaft 12 performs the dual function of (1) driving the blank or cam C, and (2) driving the mechanism which imparts the arcuate travel to the cutter or grinder head 5 mounted on head spindle 4. Approximately midway of the length of main drive shaft 12 is mounted a helical gear 23 (Fig. 2) which meshes with a similar gear 24 on a stub shaft 25 journaled in suitable bearings in feed drive casting 26 and said stub shaft 25 also carries a spur gear 27 which meshes with an intermediate idler gear 28 carried by stub shaft 29 on adjustable plate 30, said idler gear 28 meshing with spur gear 31 carried on a lead screw shaft 32 which is journaled in bearings at the end of feed drive casting 26. The lead screw 32 is axially immovable in said bearings but is rotatable in the casting 26, and engages a nut 33 (Fig. 2) secured to a slide 34 which latter is guided in a groove 26a in the feed drive casting 26 and in which groove the slide can be moved back and forth transversely of the axis of the head spindle 4 parallel with the axis of the head stock and tailstock of work table 2, the motion of the slide being dependent upon the rotation of the lead screw 32, the relative speed of which latter is dependent upon the sizes of gears 24 and 31.

Disposed in the feed drive casting 26 above the slide 34 and parallel to the axis thereof are a pair of spaced limit switches 35 (Figs. 2 and 6) actuated from slide bar 36 which is secured to slide 34, which switches 35 when contacted by their respective spaced trips 36a, as the extreme limits of desired arcuate travel is reached, stop the two-speed reversing feed motor 21 from either speed in either direction.

Upon the rear face of slide 34 is mounted a compensator plate 37 the function of which will be hereinafter described, and to said compensator plate 37 is securely fastened a master cam M having an upper inclined cam contour surface or edge M' which engages a roller 38 on a slide 39 the latter being guided in vertical grooved strips 40 disposed adjacent to the master cam M and having its axis disposed at 90° to the axis of the aforementioned slide 34.

Disposed directly below the guide strips 40, and with its axis parallel to said strips, and connected to slide 39 by a bar or link 41 (Fig. 3) is a rack bar 42 held in mesh with pinion 6 by guide 43. Thus rotation is applied to the pinion 6 as rack bar 42 is raised or lowered, dependent upon the roller 38 being actuated by master cam M on slide 34 which latter is moved by lead screw 32 under control of change speed gears 27, 28, 31 driven from main drive shaft 12 through helical spur gear 23.

The contour edge M' of master cam M may be varied, but for making cams for steering gears, the master cam M should be so formed as to impart vertical travel to the rack bar 42 in the manner and time required to make pinion 6 move the cutter or grinder head 5 (hereinafter described) through an arc of the desired magnitude, within such transverse travel of the slide 34 as the construction of parts will permit.

In cutting or grinding such cams as are employed in the so-called Ross cam and lever steering gears (such as shown in Ross Patent #1,567,997 dated December 29, 1925), the aforesaid arc of the cutter or grinder head 5 is of equal magnitude to that of the actual steering gear lever actuated by said steering cam; however in cutting or grinding such cams as are employed in the so-called Ross cam and twin-lever steering gears (such as shown in Ross Patent #2,071,235, dated February 16, 1937) the aforesaid arc of the cutter or grinder head 5 is of sufficient magnitude to pass the cutter or grinding wheel G which is carried by head 5 completely through the blank or cam C. In other words the cutter or grinding wheel G passes entirely out of contact with the said blank or cam C at each extreme end of the arcuate travel of said wheel. Thus the aforesaid arc of travel of the cutter or grinder head 5 is therefore of greater magnitude than that of the actual steering gear lever actuated by the steering gear cam.

Furthermore, in such cams as are employed in the said Ross cam and twin-lever steering gears, the chordal or angular spacing between any two desired number of complete cam turns or threads is required to be constant. This condition holds irrespective of any pitch or combination of pitches in said steering gear cam, which relation is initially provided by the cam surface or edge M' of the master cam M, in conjunction with a predetermined number of revolutions of main drive shaft 12 and, in consequence, of helical gear 23, spur gears 27, 28, 31 and worm 15 on main drive shaft section 14 which meshes with worm wheel 18 on the headstock spindle 8, and thus to a predetermined number of revolutions of leadscrew 32 (actuating slide 34) and to the blank or steering gear cam C respectively.

However, to still further enhance the accuracy of the machine the compensator plate 37 (Figs. 2, 3 and 7) is employed to provide a fine adjustment for the arcuate travel of the aforementioned self-contained cutter or grinder head 5 with respect to a predetermined number of revolutions of the blank or cam C to compensate for wear or other possible inaccuracies in the various parts concerned, such as gears 27, 28, 31, rack 42, pinion 6, worm 15, worm wheel 18, leadscrew 32, etc.

Upon slide 34 is mounted a swivel 34a having its radial center so disposed that the said radial center coincides with the radial center of roller 38 (Fig. 7) in contact with the master cam edge M' at the instant the cutter or grinder head 5 is at the center or midpoint of its arcuate path, i. e., at such time as the cutter or grinder head 5 is in its uppermost point in its arc, i. e., disposed 90° with respect to the axis of the aligned head and tailstocks 8 and 9 on work table 2. Rotation of the master cam M which is secured to the compensator plate 37 about the radial center of swivel 34a upon the slide 34 is effected by loosening the bolts 37x in slots 37y, and turning the oppositely acting set screws 37z to shift the master cam with respect to slide 34, and then tightening the bolts 37x, and such rotation applies an extended vertical travel "X" (Fig. 7) or contracted vertical travel "Y" to slide 39 with respect to a predetermined horizontal travel "Z" of slide 34 dependent upon the direction of rotation. This in turn, by reason of the connection of slide 39 with rack 42 (which meshes with pinion 6), applies a correspondingly extended or contracted arcuate travel to the cutter or grinder head 5 with respect to a predetermined number of revolutions of main drive shaft 12 and thus also of helical gears 23, spur gears 27, 28, 31 and worm 15 on main drive shaft section 14 which meshes with worm wheel 18 on head stock spindle 8, and thus also to a predetermined number of revolutions of leadscrew 32 which actuates slide 34, and of the blank or cam C respectively.

In order to take up any lost motion in the linkage, and to maintain contact between the roller 38 and the master cam edge M' springs or weights may be employed, but preferably a weight 44 is provided suspended by a chain 45 running over a sprocket 46 journaled on shaft 47 secured in standard 7 at 48 on machine base 1, said shaft 47 also carrying a pinion 49 meshing with pinion 6.

By means of gibs 3a (Fig. 3) and a groove in its underside, carriage 3 is slidably mounted upon base 1, said carriage having a slide mounting 50 disposed at 90° to the aligned head and tailstocks 8—9 upon work table 2. The carriage leadscrew 51 (Fig. 2) is axially immovable in its bearings in bracket 52 secured adjacent the front of base 1 but is rotatable therein and engages a nut 53 secured to the underside of carriage 3 by which, dependent upon the direction of rotation of handwheel 54 secured to leadscrew 51, the carriage 3 may be moved back and forth, i. e., to and from the work table 2 within such limits as the construction of parts will permit.

Figure 2:
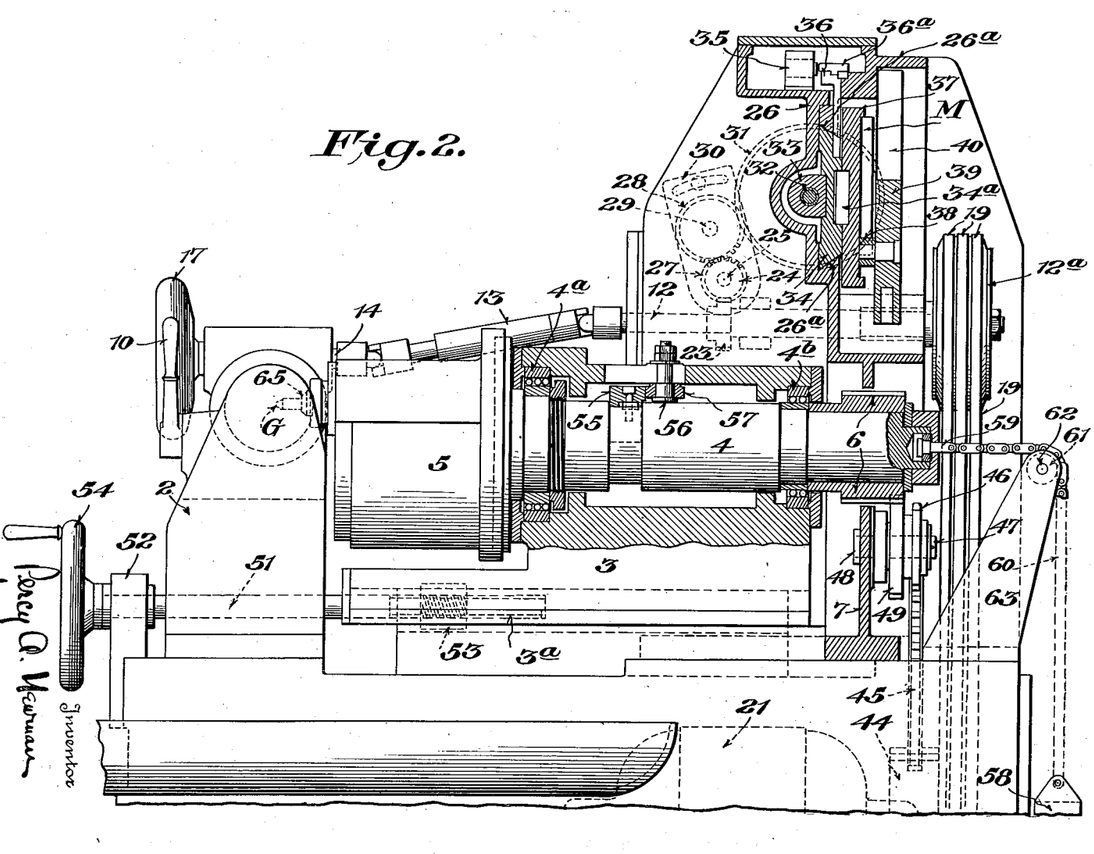
Fig. 2 is a vertical section through the parts of machine above the work table taken on the line 2—2, Fig. 1 and showing the head spindle and the master cam behind which are shown in dotted lines the master cam change gears.

Journaled in carriage 3 approximately above slide mounting 50 and parallel therewith is the headspindle 4 preferably mounted in ball bearings 4a and 4b. As shown in Fig. 2 the ball tracks of neither the inner nor outer races of the said bearings 4a—4b have any curvature, such bearings being true journals supporting the spindle 4 and performing no function of axially positioning said spindle by reason of the fact that the aforesaid spindle 4 must be permitted an axial movement in said bearings 4a—4b within such limits as the construction of the parts will permit. Secured to head spindle 4 is a cam 55, and axially immovable but rotatable on stud 56 secured to carriage 3 is roller 57. Axial positioning of head spindle 4 is obtained by maintaining contact between the aforesaid cam 55 and roller 57 by the use of springs or a weight attached to said head spindle 4. Preferably a weight 58 is suspended by chain 60 from swivel 59 on the spindle 4, chain 60 running over sprocket 61 on a shaft 62 journaled in bracket 63 attached to machine base.

Thus accurate axial positioning of head spindle 4 with respect to the axis of headstock and tailstock 8—9 on work table 2, and the consequent positioning of the cutter or grinder wheel G of head 5 with respect to the axis of the blank or cam C may readily be effected; and dependent upon the surface contour of master cam M the depth of the steering gear cam groove with respect to the axis of such steering gear cam may be held constant or may be varied as desired.

Figures 9, 10, 11:
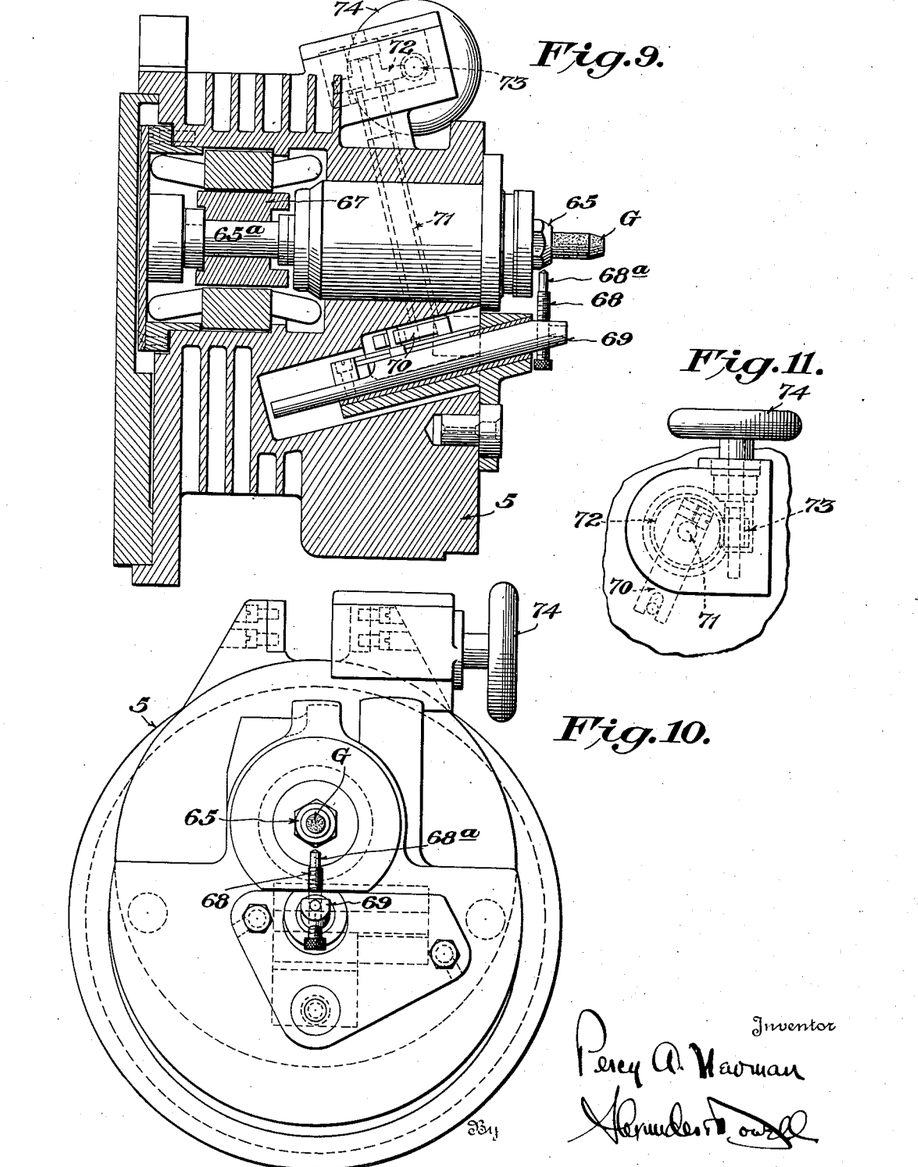
Fig. 9 is an elevation of the head showing a section through the self-contained rotatable cutter or grinder including the device for truing the grinding wheels.
Fig. 10 is an elevation of the parts shown in Fig. 9 from the operating position.
Fig. 11 is a detail plan view.

Furthermore, head spindle 4 is provided at its extreme end adjacent the work table 2 with a head 5 (Figs. 2, 9, 10) housing a spindle 65 (Figs. 2, 9 and 10) which latter is disposed with its axis parallel to, and at a distance from, the axis of the aforesaid head spindle 4 equal to the radius of the arc desired; said head 5 also having means for imparting rotation to the spindle 65 which means may be electric, pneumatic, hydraulic, mechanical, or combinations of any such; but preferably I provide an electric motor having a common axis with the aforesaid spindle 65 and having its stator windings secured in head 5, and its rotor 67 secured to an extension 65a of the cutting or grinding spindle 65. The extreme end of spindle 65 adjacent to the work table 2 is provided with the cutter or grinding wheel G (hereinbefore referred to) and any suitable means for detachably attaching said cutter G to spindle 65, as indicated at Figs. 2 and 9 may be used. In connection with the grinding wheel G, a device such as shown in Fig. 9 is used for truing and dressing the surface of said wheel. A diamond 68a is inserted at the outer end of a screw 68 in an inclined slide bar 69 mounted in head 5 whereby the said diamond 68a may be adjusted towards the surface of grinding wheel G. The axis of the slide bar 69 is disposed to the axis of the grinding wheel G at an angle equal to one-half the included angle of the desired groove in the cam C. The diamond thus traverses the length of the grinding wheel surface G as the slide bar 69 is operated by link 70 at the lower end of shaft 71 to which rotation back and forth is applied through worm wheel 72 and worm 73 operated by hand wheel 74.

Operation

Figure 4:
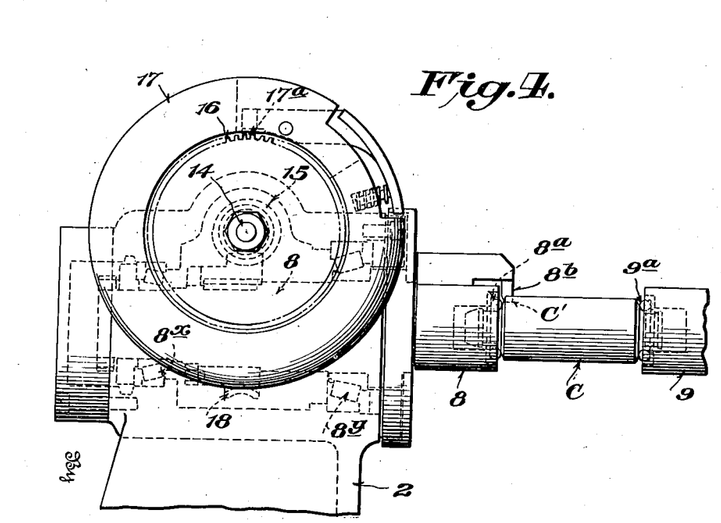
Fig. 4 is an enlarged elevation of the headstock of the work table from the front or operating position, showing the device for aligning a steering gear cam helix or lead with the master cam contour.

The blanks to be grooved, or the steering gear cams C to be ground, should be approximately cylindrical and may be provided in the usual manner at one end with an axial recess to engage a tapered end of tailstock spindle 9 and at the other end with a similar recess to engage a tapered end of the headstock spindle 8; but usually the steering gear cams C to be ground are provided with bearing or journal locations needed for the assembly of such cams into the steering gears; these locations may be then positioned and supported in ball bearings 8a, 9a as shown in Fig. 4 located in the tailstock 9 and headstock 8. Further the end of the blank positioned in the headstock should be provided with an axial slot C' (Fig. 4) to engage the key 8b on the end of headstock 8 so that when the blank is positioned between stocks 8 and 9, it will be rotated by and with the headstock 8. The slot C' and key 8b provide an effective manner of rotating the blank or cam C, but obviously other means for rotatably engaging the blank or cam C with the headstock 8 may be used, if desired.

Figures 1, 8:
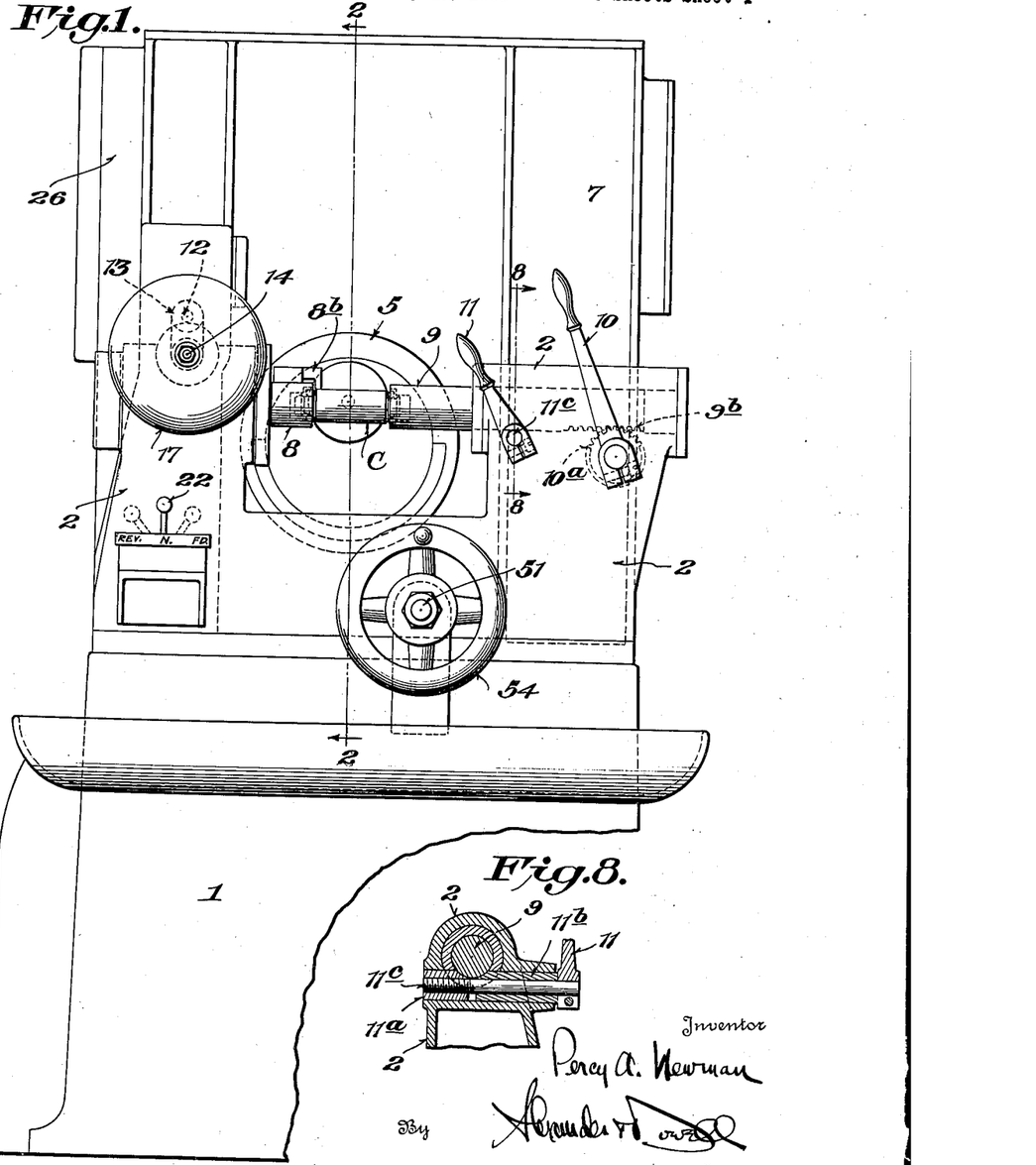
Fig. 1 is an elevation of the complete machine looking towards the operating position or front end thereof.
Fig. 8 is a detail of the tailstock clamps taken on the line 8—8, Fig. 1.
Figure 3:
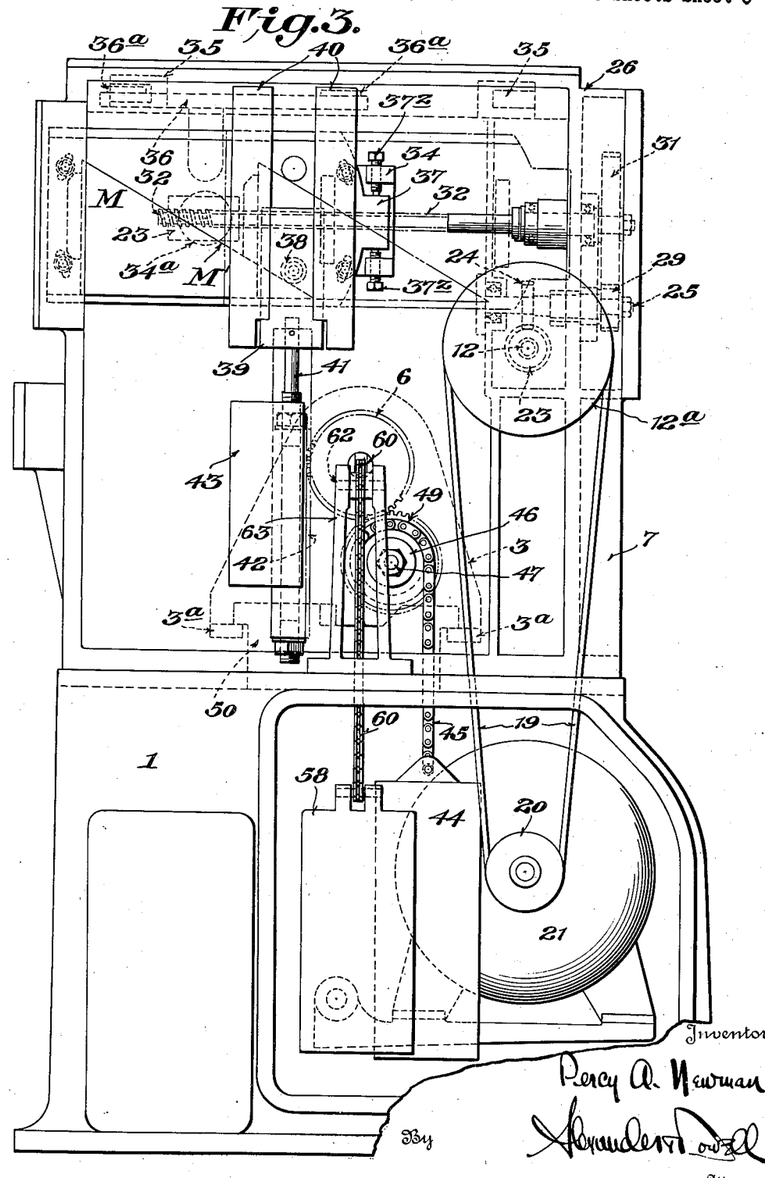
Fig. 3 is an elevation of the complete machine looking towards the rear end of the carriage, and showing the master cam and its associated mechanism for actuating the head spindle, the full lines denoting the master cam and slide at the beginning of an operation, and the dot and dash lines denoting the same at the conclusion of an operation.
Figure 7:
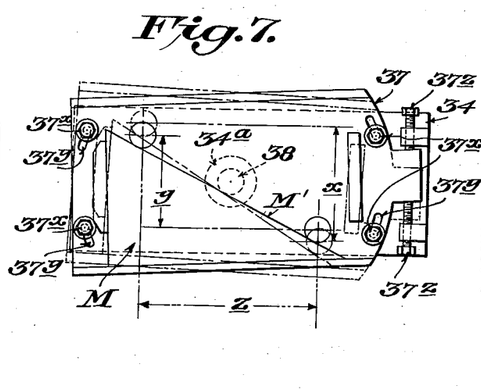
Fig. 7 is a detailed elevation of the master cam and the compensator means applied thereto.

In Fig. 1 the rotatable cutting or grinding spindle 65 in head 5 is shown at the mid-position of its arcuate movement, but at the beginning of a cutting or grinding operation the said spindle 65 should be moved to an extreme end of its desired arcuate travel, the magnitude of which as heretofore explained is dependent upon the design of the cam to be cut or ground; furthermore, said arcuate position will be adjacent either the headstock 8 or tailstock 9 according to the hand of the helix required, and in conjunction with the same the cam edge M' of master cam M may be diagonally opposite to that shown in Figs. 3 and 7 in which case the action of the rack 42 with respect to pinion 6 will be reversed, and chain 49 supporting weight 44 will be likewise reversed over sprocket 46.

When the cutter G is at the desired extreme end of its arcuate travel, and before the commencement of a cutting or grinding operation, the hand switch 22 is thrown into neutral, and the whole carriage assembly 3 housing the cutter or grinder head 5 should be moved to its extreme rear limit towards the rear of the machine. While in this position, a blank or steering gear cam C is inserted between the headstock 8 and the tailstock 9 while the carriage 3 is retracted, and the slotted end C' of blank or cam C is engaged with key 8b, and then the tailstock 9 is advanced by throwing lever 10 to support the adjacent end of said blank or cam C after which the tailstock is locked in work table 2 by means of clamps 11a—11b operable through lever 11. When the steering gear cam is thus axially aligned within the headstock and tailstock 8—9, and is engaged with key 8b, it may be important that the arcuate disposition of a previously machined groove be aligned with the arcuate disposition of the cutter or grinder wheel G so that the axis of the said cutter or grinder wheel G will coincide with the axis it assumed during the previous cutting operation.

In other words the steering gear cam C may need to be rotated slightly upon its axis with respect to an arcuate position of the cutter or grinder wheel G until such time as said cutter or grinder wheel precisely aligns with the previously grooved portion. This is accomplished by disengaging pawl 17a of handwheel 17 from clutch plate 16, and by rotating cam C through said handwheel 17 acting on worm 15 which meshes with worm wheel 18 on headstock 8 until the helix of the steering gear cam C is harmonized with the surface M' of master cam M and its transverse travel, irrespective of the constant or intermittently variable arcuate travel of the grinding wheel G with respect to constant rotation of the steering gear cam C. Then by manual rotation of handwheel 54 on screw 51, the nut 53 will move carriage 3 and the head-spindle 4, and consequently the self-contained rotating cutter or grinder head 5 towards the blank or cam G to the desired distance dependent upon the desired depth of groove to be cut in the cam C.

The main switch 22 is then shifted to the "forward" position, starting motor 21 in its forward direction and at its lower speed, and rotation is imparted to the main drive shaft 12 and from thence through the universal joint shafts 13—14 to clutch 16 thence through pawl 17a to hand wheel 17 on worm 15 which meshes with worm wheel 18 on spindle 8, a slow rotary motion being thus imparted to the blank or cam C. Simultaneously, from main drive shaft 21 through helical gears 23, change gears 24, 28, 31 and leadscrew 32 in nut 33 on slide 34, a slow motion is also imparted to the master cam M and as the latter moves to the right (Fig. 3), and cam M engaging roller 38 moves slide 39 and rack 42 upwardly or downwardly according to the hand of helix desired, and rack 42 actuates pinion 6 which causes the cutting or grinder head 5 to commence its arcuate travel, during which travel a constant or varying depth is automatically imparted to the cam groove dependent on the surface of cam 55 (Fig. 2) since headspindle 4 is axially positioned upon carriage 3 by weight 58 which maintains contact between the surface of cam 55 of the headspindle and the roller 57 on stud 56 which is immovable on the aforesaid carriage. These aforesaid motions continue until the opposite arcuate extreme is reached, wherefore trip 36a on slide bar 36 will actuate one of switches 35 (Fig. 6) and stop the motor. The operator then manually operates the handwheel 54 to retract the cutter or grinding wheel G from its cutting position, after which the switch 22 is moved into the "reverse" position and the motor 21 starts rotation in the reverse direction but at its higher speed which continues until the starting position of the cutter or grinding wheel G is reached, at which time the opposite stop 36a operates its related switch 35 and the motor 21 is again stopped.

On the reverse movement, corresponding rotation to pinion 6 is applied by means of weight 44 as it maintains contact between roller 38 and the master cam M.

I do not limit my invention to the exact form shown in the drawings, for obviously changes may be made therein within the scope of the claims.

I claim:

1. In a machine for cutting spirally grooved cams or the like, a table for supporting a cam blank to be cut; a spindle movable transversely of the axis of the blank; a rotatable cutting tool on the spindle disposed eccentrically of the axis thereof and adapted to engage the blank; a reciprocable slide adjustably carrying a master cam; a common drive shaft for rotating said blank and for simultaneously imparting reciprocation to the slide; means operated by the master cam when the slide is reciprocated to impart corresponding movement to the spindle, thereby causing the cutting tool to move in an arcuate path; and a compensator plate angularly adjustable on said slide and directly carrying said master cam, whereby angular adjustment of the plate will vary the amount of movement of the spindle for a given travel of the slide.

2. In combination with a machine as set forth in claim 1, a carriage movable transversely of the axis of the blank and carrying said spindle; means for moving said carriage; and cam means for axially shifting the spindle in the carriage towards the blank during the cutting operation, thereby controlling the depth of groove in the blank.

3. In combination with a machine as set forth in claim 1, said table including a rotatable head stock; a member on said head stock engaging the blank to cause the latter to rotate therewith; a rotatable sleeve having a hand wheel and forming a journal for the adjacent end of the drive shaft; means for rotating the headstock by and with the sleeve; a clutch plate on the said shaft disposed adjacent said hand wheel; and locking means normally connecting the clutch plate and wheel, whereby when the locking means is disengaged the blank may be rotated by the hand wheel independently of the rotation of the spindle.

4. In a machine for cutting spirally grooved cams or the like, a table for supporting the cam blank to be cut; an axially reciprocable spindle disposed transversely of the axis of the blank and having a pinion; a rotatable cutting tool on the spindle disposed eccentrically of the axis thereof and adapted to engage the blank; a reciprocable slide carrying a master cam; a drive shaft for rotating the blank; a lead screw for imparting reciprocation to the slide, reducing gearing interposed between the drive shaft and lead screw; a second reciprocable slide operating said spindle pinion and having a roller engaging the contour surface of the master cam, whereby as the first mentioned slide is reciprocated the second slide will be shifted to impart rotation to the spindle, and cause the cutting tool to move in an arcuate path.

5. In a machine as set forth in claim 4, said master cam being carried by a compensator plate rotatably adjustable on the first mentioned slide about an axis coaxial with that of the said roller when the cutting tool is at the center of its arcuate path, whereby the amount of rotation of the spindle pinion with respect to a predetermined travel of said first mentioned slide may be varied; and means for maintaining the compensator plate in adjusted position on said slide.

6. In combination with a machine as set forth in claim 4, a carriage movable transversely of the axis of the blank and carrying said spindle; means for moving said carriage; and cam means for axially shifting the spindle in the carriage towards the blank during the cutting operation to control the depth of groove being cut in the blank.

7. In combination with a machine as set forth in claim 4, said table including a rotatable head stock having a gear; a key on said head stock engaging a preformed groove in the blank to cause the latter to rotate therewith; a hollow pinion meshing with said gear and having a hand wheel on one end; said drive shaft having a portion journaled in the hollow pinion; a clutch plate on the shaft disposed within the rim of said wheel; and a spring pressed pawl on the rim normally engaging the clutch plate, whereby when the pawl is disengaged the blank may be manually rotated by the hand wheel independently of the rotation of the spindle.

8. In a machine for cutting spirally grooved cams or the like, a table for supporting the cam blank to be cut; a spindle disposed transversely of the axis of the blank and having a pinion; a cutter head on the spindle having a rotatable cutting tool disposed eccentrically of the axis thereof and adapted to engage the blank; a reciprocable slide carrying a master cam; a lead screw for operating said slide; a drive shaft for rotating the blank; reducing gearing interposed between the drive shaft and lead screw for simultaneously imparting reciprocation to the slide; a second reciprocable slide having a rack meshing with said spindle pinion and having a roller engaging the contour surface of the master cam, whereby as the first mentioned slide is reciprocated the second slide will be shifted to impart rotation to the spindle and cause the cutting tool to move in an arcuate path, said master cam maintaining a predetermined speed ratio between the rotation of the blank and the arcuate movement of the cutting tool to provide a groove of constant or variable pitch.

9. In a machine as set forth in claim 8, a compensator plate carrying the master cam and rotatably adjustable on said first mentioned slide about an axis coaxial with that of the said roller when the cutting tool is at the center of its arcuate path, whereby the amount of rotation of the spindle pinion with respect to a predetermined travel of said first mentioned slide may be varied; and means for maintaining the compensator plate in adjusted position on said slide.

10. In a machine as set forth in claim 1, said compensator plate being rotatably adjustable on said slide about an axis corresponding with the point of contact of the operating means with the master cam at the time the cutting tool is at the center of its arcuate path.

11. In a machine as set forth in claim 1, said compensator plate being rotatably adjustable on said slide about an axis corresponding with the point of contact of the operating means with the master cam at the time the cutting tool is at the center of its arcuate path; and opposed set screws on the slide engaging opposed sides of the plate for maintaining the plate in adjusted position on the slide.

12. In combination with a machine as set forth in claim 8, a carriage movable transversely of the axis of the blank and carrying said spindle; means for moving said carriage; and cam means for axially shifting the spindle in the carriage towards the blank during the cutting operation to control the depth of groove being cut in the blank.

13. In combination with a machine as set forth in claim 8, said table including a rotatable head stock; a member on said head stock engaging the blank to cause the latter to rotate therewith; a rotatable sleeve having a hand wheel and forming a journal for the adjacent end of the drive shaft; means for rotating the head stock by and with the sleeve; a clutch plate on the said shaft disposed adjacent said hand wheel; and locking means normally connecting the clutch plate and wheel, whereby when the locking means is disengaged the blank may be rotated by the hand wheel independently of the rotation of the spindle 14. In a machine for cutting spirally grooved cams or the like, a table for supporting a cam blank to be cut; a spindle disposed transversely of the axis of the blank; a rotatable blank engaging cutting tool on the spindle disposed eccentrically of the axis thereof and adapted to move in an arcuate path; a reciprocable slide; a master cam angularly adjustable on said slide; a common drive shaft for rotating said blank and for simultaneously imparting reciprocation to the slide; and means operated by the master cam when the slide is reciprocated to impart corresponding movement to the spindle for a given travel of the slide according to the angular adjustment of the master cam on the reciprocable slide.

15. In a machine as set forth in claim 14, said master cam being rotatably adjustable on said slide about an axis corresponding with the point of contact of the operating means therewith at the time the cutting tool is at the center of its arcuate path.

16. In a machine as set forth in claim 14, said master cam being rotatably adjustable on said slide about an axis corresponding with the point of contact of the operating means therewith at the time the cutting tool is at the center of its arcuate path; and means for maintaining the master cam in adjusted position on the slide.

17. In combination with a machine as set forth in claim 14, a carriage movable transversely of the axis of the blank and carrying said spindle; means for moving said carriage; and cam means for axially shifting the spindle in the carriage towards the blank during the cutting operation, thereby controlling the depth of groove in the blank.

18. In combination with a machine as set forth in claim 14, said table including a rotatable head stock; a member on said head stock engaging the blank to cause the latter to rotate therewith; a rotatable sleeve having a hand wheel and forming a journal for the adjacent end of the drive shaft; means for rotating the head stock by and with the sleeve; a clutch plate on the said shaft disposed adjacent said hand wheel; and locking means normally connecting the clutch plate and wheel, whereby when the locking means is disengaged the blank may be rotated by the hand wheel independently of the rotation of the spindle.

19. In a machine for cutting spirally grooved cams or the like, a table for supporting a cam blank to be cut; a spindle disposed transversely of the axis of the blank and having a pinion; a rotatable blank engaging cutting tool on the spindle disposed eccentrically of the axis thereof and adapted to move in an arcuate path; a reciprocable slide; a master cam angularly adjustable on said slide; a drive shaft for rotating the blank; a lead screw for imparting reciprocation to the slide, reducing gearing interposed between the drive shaft and lead screw; a second reciprocable slide operating said spindle pinion and having a roller engaging the contour surface of the master cam, whereby as the first mentioned slide is reciprocated the second slide will be shifted to impart corresponding movement to the spindle for a given travel of the first mentioned slide according to the angular adjustment of the master cam on the reciprocable slide.

20. In a machine as set forth in claim 19, said master cam being rotatably adjustable on the first mentioned slide about an axis coaxial with that of the said roller when the cutting tool is at the center of its arcuate path; and means for maintaining the master cam in adjusted position on said slide.

21. In combination with a machine as set forth in claim 19, a carriage movable transversely of the axis of the blank and carrying said spindle; means for moving said carriage; and cam means for axially shifting the spindle in the carriage towards the blank during the cutting operation to control the depth of groove being cut in the blank.

22. In combination with a machine as set forth in claim 19, said table including a rotatable head stock having a gear; a key on said head stock engaging a preformed groove in the blank to cause the latter to rotate therewith; a hollow pinion meshing with said gear and having a hand wheel on one end; said drive shaft having a portion journaled in the hollow pinion; a clutch plate on the shaft disposed within the rim of said wheel; and a spring pressed pawl on the rim normally engaging the clutch plate, whereby when the pawl is disengaged the blank may be manually rotated by the hand wheel independently of the rotation of the spindle.

23. In a machine for cutting spirally grooved cams or the like, a table for supporting a cam blank to be cut; a spindle disposed transversely of the axis of the blank; a cutter head on the spindle having a rotatable blank engaging cutting tool disposed eccentrically of the axis thereof; a reciprocable slide adjustably carrying a master cam; a common drive shaft for rotating the blank and for simultaneously imparting reciprocation to the slide; and means operated by the master cam when the slide is reciprocated to impart corresponding rotation to the spindle and cause the cutting tool to move in an arcuate path; said master cam being rotatably adjustable on said slide about an axis coaxial with the point of contact of the operating means therewith when the cutting tool is at the center of its arcuate path, whereby the amount of rotation of the spindle with respect to a predetermined travel of said slide may be varied to provide a groove of constant or variable pitch; and means for maintaining the master cam in adjusted position on said slide.

24. In combination with a machine as set forth in claim 23, a carriage movable transversely of the axis of the blank and carrying said spindle; means for moving said carriage; and the cam means for axially shifting the spindle in the carriage towards the blank during the cutting operation to control the depth of groove being cut in the blank.

25. In combination with a machine as set forth in claim 23, said table including a rotatable head stock; a member on said head stock engaging the blank to cause the latter to rotate therewith; a rotatable sleeve having a hand wheel and forming a journal for the adjacent end of the drive shaft; means for rotating the head stock by and with the sleeve; a clutch plate on the said shaft disposed adjacent said hand wheel; and locking means normally connecting the clutch plate and wheel, whereby when the locking means is disengaged the blank may be rotated by the hand wheel independently of the rotation of the spindle.

PERCY A. NEWMAN.